(12) United States Patent
Koeune et al.

(10) Patent No.: US 8,205,652 B2
(45) Date of Patent: Jun. 26, 2012

(54) SELF-SUPPORTING PNEUMATIC TIRE WITH OPTIMIZED PLY LINE

(75) Inventors: Thierry Paul-Marie Gabriel Koeune, Fauvillers (BE); Christian Jean-Marie Kaes, Schrondweiler (LU); Laurent Roger Andre Dubos, Niederfeulen (LU)

(73) Assignee: The Goodyear Tire & Rubber Company, Akron, OH (US)

(*) Notice: Subject to any disclaimer, the term of this patent is extended or adjusted under 35 U.S.C. 154(b) by 669 days.

(21) Appl. No.: 12/333,471

(22) Filed: Dec. 12, 2008

(65) Prior Publication Data

US 2010/0147439 A1    Jun. 17, 2010

(51) Int. Cl.
  *B60C 17/04* (2006.01)
  *B60C 17/00* (2006.01)
  *B60C 15/00* (2006.01)
  *B60C 15/06* (2006.01)
  *B60C 9/02* (2006.01)

(52) U.S. Cl. ........ 152/549; 152/517; 152/541; 152/546; 152/547; 152/550; 152/552; 152/555

(58) Field of Classification Search ................... 152/517
See application file for complete search history.

(56) References Cited

U.S. PATENT DOCUMENTS

2005/0133135 A1* 6/2005 Corvasce et al. ............. 152/517
2005/0236085 A1* 10/2005 Markoff et al. ............... 152/454

FOREIGN PATENT DOCUMENTS

| CN | 1259910 A | 7/2000 |
| CN | 1265067 A | 8/2000 |
| CN | 1410253 A | 4/2003 |

* cited by examiner

*Primary Examiner* — Justin R. Fischer
*Assistant Examiner* — Philip N Schwartz
(74) *Attorney, Agent, or Firm* — June E. Rickey

(57) ABSTRACT

The present invention is directed to a self-supporting tire. More specifically, the tire has a carcass, a tread, and a belt reinforcing structure located radially outward of the carcass and radially inward of the tread. The carcass is comprised of a reinforcing ply structure extending between a pair of bead portions, a pair of sidewalls, each sidewall located radially outward of one of the pair of bead portions, and a pair of inserts located in each sidewall. A first insert and second insert are located between the innerliner and the ply.

14 Claims, 1 Drawing Sheet

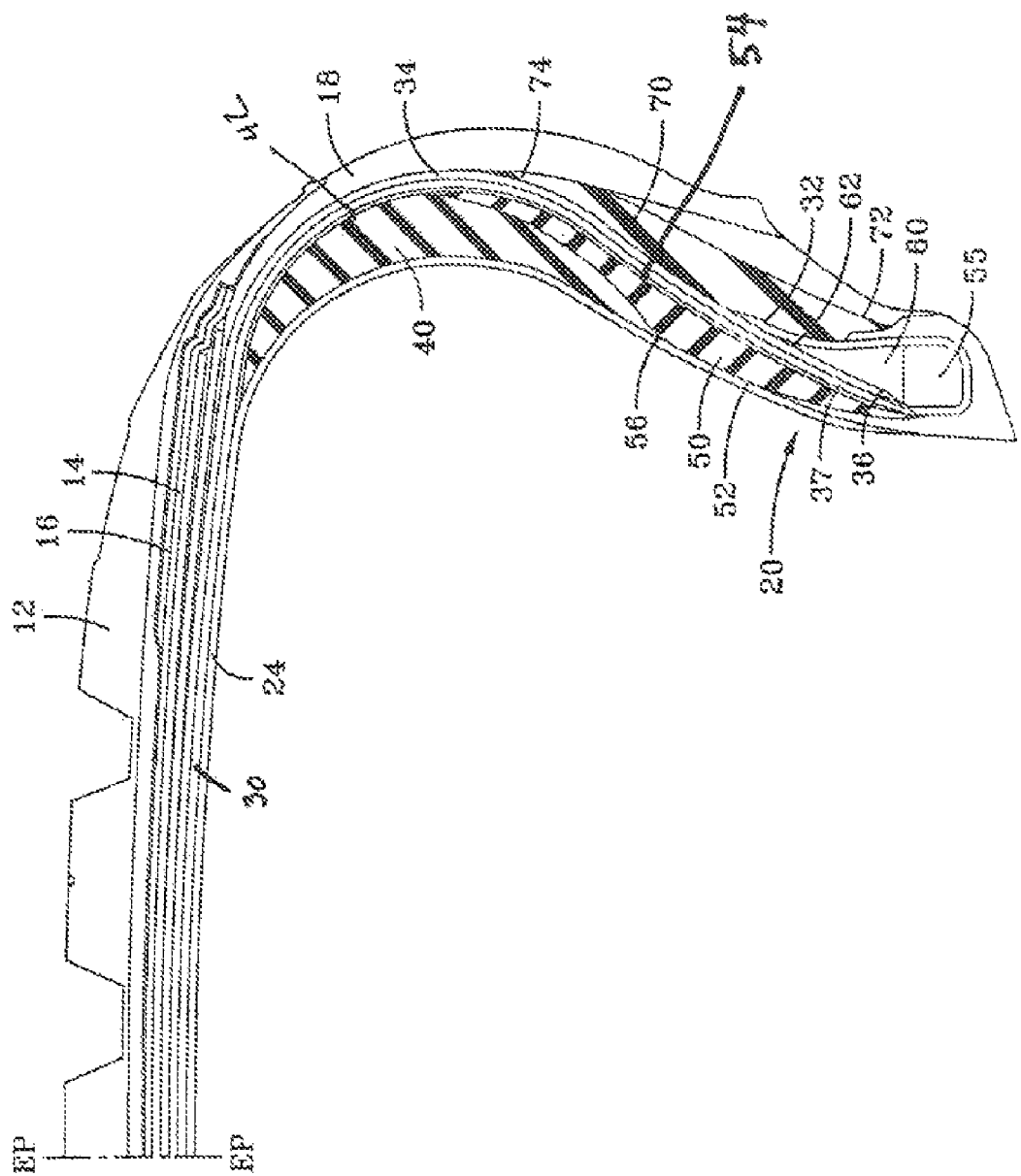

SELF-SUPPORTING PNEUMATIC TIRE WITH OPTIMIZED PLY LINE

FIELD OF THE INVENTION

The present invention is directed to a pneumatic radial tire capable of running in conditions wherein the tire is operated at less than conventional inflation pressure.

BACKGROUND OF THE INVENTION

Self-supporting run-flat tires have been commercialized for many years. The primary characteristic of such tires is an increase in the cross-sectional thickness of the sidewalls to strengthen the sidewalls. These tires, when operated in the uninflated condition, place the reinforcing sidewall inserts in compression. Due to the large amounts of rubber required to stiffen the sidewall members, heat build-up is a major factor in tire failure. This is especially true when the tire is operated for prolonged periods at high speeds in the uninflated condition.

U.S. Pat. No. 5,368,082 teaches the employment of special sidewall inserts to improve stiffness. Approximately six additional pounds of weight per tire are required to support an 800 lb load in an uninflated tire. The earliest commercial use of such runflat tires were used on a high performance vehicle and had a very low aspect ratio. The required supported weight for an uninflated luxury car tire, having an aspect ratios in the 55% to 65% range or greater, approximates 1400 lbs load. Such higher loads for larger run-flat tires meant that the sidewalls and overall tire had to be stiffened to the point of compromising ride. Luxury vehicle owners simply will not sacrifice ride quality for runflat capability. The engineering requirements have been to provide a runflat tire with no loss in ride or performance. In the very stiff suspension performance type vehicle the ability to provide such a tire was comparatively easy when compared to luxury sedans with a softer ride characteristic. Light truck and sport utility vehicles, although not as sensitive to ride performance, provide a runflat tire market that ranges from accepting a stiffer ride to demanding the softer luxury type ride.

It is thus desired to provide a novel run on flat tire design that is a "soft" run on flat design, so that no compromise in comfort is required while having the same chassis loading as a regular pneumatic tire.

SUMMARY OF THE INVENTION

The present invention is directed to a self-supporting tire. More specifically, the tire has a carcass, a tread, and a belt reinforcing structure located radially outward of the carcass and radially inward of the tread. The carcass is comprised of a reinforcing ply structure extending between a pair of bead portions, a pair of sidewalls, each sidewall located radially outward of one of the pair of bead portions, and a pair of inserts located in each sidewall. A first insert and second insert are located between the innerliner and the ply.

DEFINITIONS

The following definitions are controlling for the disclosed invention.

"Apex" means an elastomeric filler located radially above the bead core and between the plies and the turnup ply.

"Annular"; formed like a ring.

"Axial" and "axially" are used herein to refer to lines or directions that are parallel to the axis of rotation of the tire.

"Circumferential" means lines or directions extending along the perimeter of the surface of the annular tire parallel to the Equatorial Plane (EP) and perpendicular to the axial direction.

"Design rim" means a rim having a specified configuration and width. For the purposes of this specification, the design rim and design rim width are as specified by the industry standards in effect in the location in which the tire is made. For example, in the United States, the design rims are as specified by the Tire and Rim Association. In Europe, the rims are as specified in the European Tyre and Rim Technical Organization—Standards Manual and the term design rim means the same as the standard measurement rims. In Japan, the standard organization is The Japan Automobile Tire Manufacturer's Association.

"Design rim width" is the specific commercially available rim width assigned to each tire size.

"Inner" means toward the inside of the tire and "outer" means toward its exterior.

"Self-supporting run-flat" means a type of tire that has a structure wherein the tire structure alone is sufficiently strong to support the vehicle load when the tire is operated in the uninflated condition for limited periods of time and speed, the sidewall and internal surfaces of the tire not collapsing or buckling onto themselves, without requiring any internal devices to prevent the tire from collapsing.

"Sidewall insert" means elastomer or cord reinforcements located in the sidewall region of a tire; the insert being in addition to the carcass reinforcing ply and outer sidewall rubber that forms the outer surface of the tire.

"Spring Rate" means the stiffness of tire expressed as the slope of the load deflection curve at a given pressure.

"Vertical Deflection" means the amount that a tire deflects under load.

BRIEF DESCRIPTION OF THE DRAWINGS

The invention will be described by way of example and with reference to the accompanying drawings in which:

FIG. 1 is a cross-sectional configuration of one half of a self-supporting run-flat tire;

DETAILED DESCRIPTION OF THE INVENTION

The following language is of the best presently contemplated mode or modes of carrying out the invention. This description is made for the purpose of illustrating the general principals of the invention and should not be taken in a limiting sense. The scope of the invention is best determined by reference to the appended claims.

FIG. 1 illustrates a tire 10 of the present invention that is designed to be operable should a loss of air pressure occur. The tire 10 has a radially outer ground engaging tread 12, and a belt structure 14 located in the crown portion of the tire underneath the tread. The belt structure 14 contains one or more belts with an optional shoulder overlay 16 to protect the belts at the shoulder portion of the crown. The tire 10 further comprises a pair of sidewall portions 18 which extend radially inward from the tread and terminate in a bead region 20. Each bead region further comprises a bead wire 55 having any desired shape. The bead region 20 may further include an optional first apex 60 and an optional second apex 70 as described in more detail, below. The bead portion may also include other optional and non-illustrated elements such as flippers, chippers, toe guards and chafers.

The tire 10 of the present invention further includes a carcass which includes an inner liner 24 which is air impervious, and extends from one bead region 20 to the other. The carcass also includes a first reinforcing ply 30 and a second optional reinforcing ply 34. The first reinforcing ply 30 is the radially innermost ply and extends under the crown portion of the tire and axially outwards of a first insert 40 in the upper shoulder area of the tire. The first insert 40 is located in the upper shoulder area near the crown, and is located between the innerliner 24 and the first reinforcing ply 30. The first reinforcing ply 30 extends axially outward and adjacent the axially outer portion 42 of the first insert 40. The first reinforcing ply also extends axially outward and adjacent the axially outer portion 54 of a second insert 50. Thus, the first reinforcing ply transitions from an axially outward position in the upper shoulder area of the tire to an axially inward position in the bead region 20. The first and second insert are shaped and positioned to modify the first reinforcing plyline so that the first reinforcing ply is loaded in tension whether the tire is inflated or deflated. The tension loading is thus minimized in the inserts 40, 50, as the first reinforcing ply carries the load. Details of the first and second insert 40, 50 are described, below.

In the bead region of the tire, the first reinforcing ply 30 is located between the second insert 50 and the optional bead apex 60. The first reinforcing ply is anchored to bead wire 55. One method of anchoring the first reinforcing ply 30 is to wrap the ply 30 around the bead and end in a turn up 32. The turn up 32 preferably extends past the tip 62 of apex 60 and abuts a portion of the second reinforcing ply 34. The first reinforcing ply 30 may be anchored to the bead region 20 in other configurations, such as a reverse turnup or locked bead construction or high ply ending or envelop (ending under belt edges).

The optional second reinforcing ply 34 is located radially outward and adjacent the first ply and has a terminal end 36 that can terminate in the vicinity of bead wire 55. Preferably, the terminal end 36 is located axially outward of the down portion 37 of the first reinforcing ply and radially outward of the bead wire 55. The terminal end 36 of the second reinforcing ply does not necessary wrap around either bead, in this case it is considered to be a floating ply because it is not anchored around each bead. Alternatively, the terminal end 36 may be anchored to the bead by wrapping around the bead in a turnup or reverse turn up or by other methods known to those skilled in the art.

In the case of floating ply, the lower portion of the second reinforcing ply 34 abuts the first bead apex 60. The first optional bead apex 60 is located radially outward of the bead core 55 and between the lower end of the second reinforcing ply 34 and the turn-up portion 32 of the first reinforcing ply. The first optional bead apex 60 preferably has a triangular shape with a height that ranges from about 0.3 to about 3 times the bead height, and more preferably about 1.5 to about 2 times the bead height. The first apex 60 is shaped and sized to keep tension in the ply turnup 32 for both the inflated and deflated tire conditions. The bead apex 60 is typically formed of an elastomer or rubber having a Shore A hardness in the range of 60 to about 90, more preferably about 70 to about 80.

As described above, the tire of this embodiment further includes a second, optional bead apex 70. The second apex 70 is located between the sidewall 18 and the ply 34. The second apex 70 has a radially inner end 72 located near the radially outer portion of the bead wire 55, and a radially outer end 74 that extends in the range from about ⅓ to about ½ the height of the sidewall. The second bead apex 70 is typically formed of an elastomer or rubber having a Shore A hardness at 23 degrees C. in the range of 50 to about 90, more preferably about 60 to about 80. The second apex 70 is shaped and sized to keep tension in the ply turnup 32 for both the inflated and deflated tire conditions.

The first insert 40 is crescent shaped or curved and shaped so that the first ply 34 is kept under tension in both the inflated and the deflated conditions. The insert 40 preferably has a maximum thickness B at a location between the tread edge and the radial location of the upper sidewall of the tire. B ranges from about 5 to about 20 mm and occurs at a radial height of about ⅔ of the section height. The insert 40 is formed of an elastomer or rubber having a Shore A hardness at 23 degrees C. in the range of 50 to about 75, more preferably about 55 to about 65. The function of the insert 40 is to stiffen/support the sidewall 18 of the tire 10 and to keep the ply under tension when the tire 10 is operated at reduced or insignificant inflation pressure. If the ply is kept in tension, the tension load of the inserts 40, 50 are minimized.

The second insert 50 has an asymmetrical shape. The radially outer end of the second insert overlaps with the first insert 40. The curvature of the axially inner surface of the second insert is concave in the radially outer portion and convex in the radially inner portion. The second insert has a different shore A hardness than the first insert 40, and it is preferred that the second insert be stiffer relative to the first insert. Thus the second insert has a higher relative shore A hardness than the first insert 40.

The inserts 40, 50 are elastomeric in nature and may have material properties selected to enhance inflated ride performance while promoting the tire's run-flat durability. The inserts 40, 50 if desired, may also be individually reinforced with polyethylene or short fibers. Thus, one or more of such inserts 40, 50 may be so reinforced.

The inserts 40, 50 and apexes 60, 70 may have a tangent delta in the range of about 0.02 to about 0.06, and more preferably in the range of about 0.025 and 0.045. The tangent delta is measured under shear at 70 degrees C., and under a deformation of 6%, using a Metravib analyzer at a frequency of 7.8 Hertz.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A pneumatic tire comprising: a carcass, a tread, and a belt reinforcing structure located radially outward of the carcass and radially inward of the tread, a pair of sidewalls, each sidewall located radially outward of one of the pair of bead portions, a first and second apex, and a first and second insert, wherein the carcass further includes a first reinforcing ply extending under the tread, wherein the first insert and second inserts are positioned between an innerliner and the first reinforcing ply, wherein a radially inner end of the first insert overlaps with a radially outer end of the second insert, wherein the second insert has a axially inner surface having a radially inner portion and a radially outer portion, wherein the curvature of the radially outer portion is concave and the curvature of the radially inner portion is convex.

2. The tire of claim 1 wherein a second reinforcing ply is located radially outward of the first reinforcing ply.

3. The tire of claim 1 wherein the first ply is anchored about each bead and terminates in a turnup end.

4. The tire of claim 2 wherein the second ply extends from one bead region to the other bead region, but does not wrap around each bead.

5. The tire of claim 2 wherein the second ply is axially outward of the first and second insert.

6. The tire of claim 2 wherein the second ply is axially inward of a first and second apex.

7. The tire of claim 1 wherein the first insert has a shore A hardness measured at 23 degrees C. in the range of about 50 to about 70.

8. The tire of claim 1 wherein the first insert has a shore A hardness value less than the shore A hardness of the second insert.

9. The tire of claim 1 wherein the first insert has a shore A hardness value different than the shore A hardness of the second insert.

10. The tire of claim 1 wherein the first insert has a shore A hardness measured at 23 degrees C. in the range of about 55 to about 65.

11. The tire of claim 1 wherein the second insert has a shore A hardness measured at 23 degrees C. in the range of about 60 to about 80.

12. The tire of claim 1 wherein the second insert has a shore A hardness measured at 23 degrees C. in the range of about 65 to about 75.

13. The tire of claim 1 wherein the first insert has a first end located near the crown portion of the tire, and a second, radially innermost end located in the range of about ¼ to about ½ the section height.

14. The tire of claim 1 wherein the second insert has a radially outermost end located in the range of about ½ to ¾ of the section height, and a second, radially innermost end terminating in abutting contact with the bead.

* * * * *